Nov. 5, 1946.                C. E. GARNIER                2,410,439
                        DENTAL HAND-PIECE CHUCK
                        Filed March 18, 1942
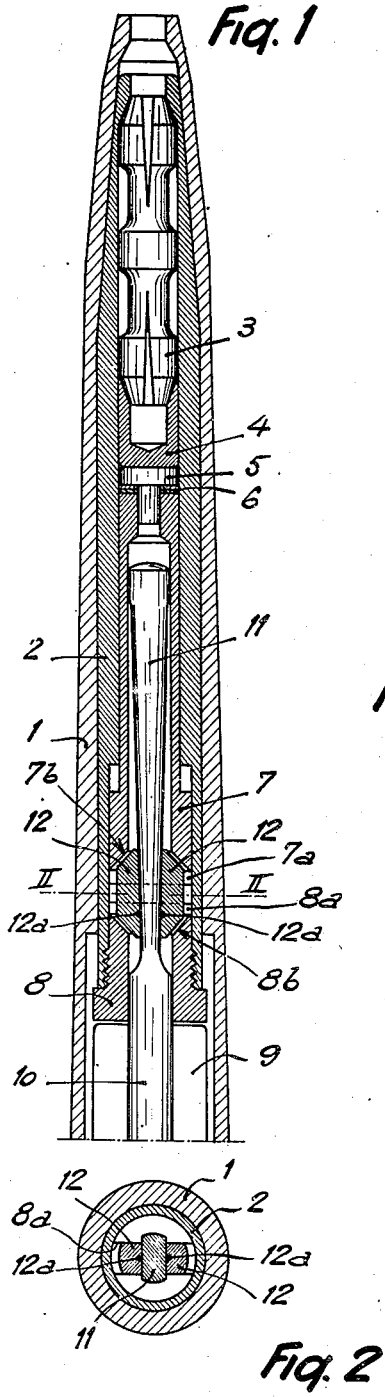
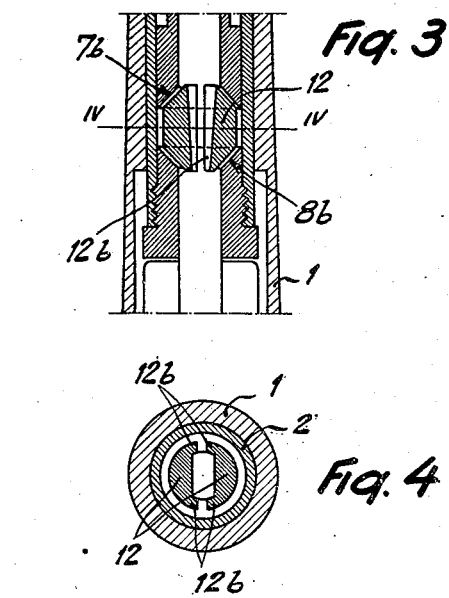
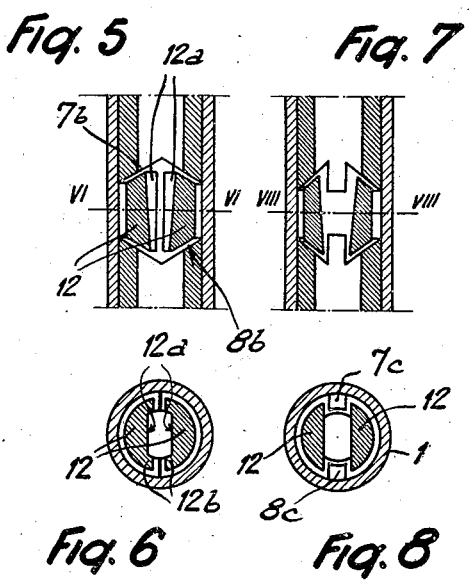
Inventor:
Claude Etienne Garnier
By Sager & Malcolm
Attorneys Patented Nov. 5, 1946

2,410,439

UNITED STATES PATENT OFFICE 2,410,439

DENTAL HAND-PIECE CHUCK

Claude Etienne Garnier, Besancon, France; vested in the Alien Property Custodian Application March 18, 1942, Serial No. 435,196
In France May 20, 1941

12 Claims. (Cl. 279—54)

The present invention relates to the hand pieces or holding devices for rotary tools as used by dentists.

These devices include, inside a fixed outer body or sleeve, a socket rotating together with the driving axis or shaft and, inside this socket, a tool-holder into whose contractile jaws is inserted the end of the tool or other small instruments to be gripped and rotated in use. The tools are connected to the rotating axis or shaft by contracting the jaws of the tool-holder, by pushing said tool holder toward the forward end of the socket in which it is housed, whereby, in the course of this longitudinal displacement, the end of the tool-holder engages in a cone formed inside the socket whereby the jaws are forced toward each other and tightly grasp the tool between them.

Up to the present time, this longitudinal displacement of the jaw-holder has been obtained through the sliding displacement of an inner inclined surface which pushes said holder in either of the two following manners:

(a) through a small lever contained in the socket in which the jaw-holder is housed; or (b) through the action of two balls, also contained in this socket, and which are forced radially, by the sliding motion of an inclined surface of the rotating axis or shaft, between two circular conical cups, one of which bears against one end of the jaw-holder, while the other one is fixed to the rear end of the socket; this radial movement of the balls thereby causing said conical cups to be moved away from each other in the longitudinal direction, whereby the desired longitudinal displacement of the tool-holder is produced.

Both of these devices involves serious disadvantages.

The device including a small lever is very difficult to manufacture and it is very complicated to take apart.

In the device including balls, said balls, which are necessarily very hard, contact the surfaces of the cups with which they are to cooperate only at one point, so that, after a certain time, they project into the surface of said cups and deform them. Furthermore, as these cups are of circular cross-section, it is necessary to keep the balls in opposed diametral relation to each other, at least when assembling the parts, by means of a cage which is necessarily rather weak. Finally, as the rotation of the tool or instrument is imparted through the central axis or shaft which carries the inclined surface serving to force the balls radially, the drive of the socket is obtained only through the wedging of these balls.

The object of the present invention is to provide a device which avoids the above mentioned drawbacks.

According to the present invention, the longitudinal displacement of the jaw-holder, in order to tighten the jaws thereof on the tool, is obtained by radially forcing wedges of suitable shape between two sleeves arranged substantially as the cups above referred to, but provided on their adjacent ends with oblique surfaces constituting both housings and friction surfaces for said wedges. The wedges are provided on the one hand with a flat face which bears against the oblique face of the inclined surface carried by the rotating axis or shaft, and, on the other hand, two faces, which are also flat, cooperating with the oblique surfaces of the sleeves.

With such a device, a longitudinal sliding of the inclined surface causes the wedges to move outwardly and this outward motion produces, through the cooperation of the oblique surfaces of the wedges and of the sleeves respectively, the desired relative longitudinal displacement of the jaw-holder and of the socket.

In order to keep the wedges in correct working position, I may provide a special shape of the surfaces which laterally limit the friction surfaces of the sleeves. I may also make these wedges of a special shape so that they partly surround the piece carrying the inclined surface, or combine both of these features.

With such a wedging system, as the contacting surfaces are of relatively large area, no deformation can occur and the wedges are positively held in proper position, so that they constitute keys for transmitting the rotary motion of the shaft to the socket.

Other features of the present invention will appear from the following detailed description of some specific embodiments thereof.

The preferred embodiments of the present invention hereinafter described, with reference to the accompanying drawing, are disclosed merely by way of example. In the drawing:

Fig. 1 is a longitudinal section taken through the forepart of a tool holding device according to the invention;

Fig. 2 is a cross-sectional view taken on the line II—II of Fig. 1;

Figure 3 is a fragmentary longitudinal sectional view taken through another embodiment of the invention;

Fig. 4 is a cross-sectional view taken on the line IV—IV of Fig. 3;

Fig. 5 is a fragmentary longitudinal sectional view taken through another embodiment of the invention with the central piece which carries the inclined control surface omitted.

Fig. 6 is a cross-sectional view taken on the line VI—VI of Fig. 5;

Fig. 7 is a fragmentary longitudinal sectional view taken through a further embodiment of the invention.

Fig. 8 is a cross-sectional view taken on the line VIII—VIII of Fig. 7.

The tool holding device includes, in the usual manner, an external body or sleeve 1 in which a socket 2 is arranged to turn. A tool-holder 3 is housed inside this socket 2. The tightening of said holder 3, for clamping a tool in the forward end thereof, is obtained by pushing said holder forwardly or outwardly in the longitudinal direction inside socket 2.

At its rear end, tool-holder 3 is mounted in a piece 4 which bears, through piece 5 and adjustment rings 6, against the end of a sleeve 7, which constitutes one of the two sleeves involved. The other sleeve, designated by reference numeral 8, is fixed in the rear end of socket 2 by means of screw threads. The sleeve 8 in turn further bears against the usual piece 9 inside of which the axis or shaft 10, which transmits the rotating motion, is journalled. This axis or shaft 10 carries the double inclined surface 11, of small inclination, which cooperates with wedges 12 as above explained. The portion of the shaft 10 having the inclined surfaces 11 extends through the bores of sleeves 7 and 8.

Wedges 12 are mounted on either side of inclined surfaces 11. They bear against the inclined surfaces 11 through their respective faces 12a. They cooperate laterally with the walls of notches 7a and 8a provided in the facing ends of sleeves 7 and 8 respectively, so that the rotating movement of wedges 12, imparted thereto by engagement with the tapered shaft surfaces 11, is transmitted to these sleeves 7 and 8. Sleeves 7 and 8 are further provided with oblique faces adapted to cooperate with corresponding oblique faces of wedges 12. It will be readily understood from the foregoing that these wedges are thus always held in the correct position shown in the drawing.

It will also be clear that the apparatus can be taken apart by merely unscrewing sleeve 8, and that the reassembling of the parts is very simple owing to the fact that the wedges can readily be inserted into place.

When the shaft 10 is pulled with respect to the outer body 1, the inclined surfaces of said piece 11 act against wedges 12, between which it slides, whereby said wedges are forced radially outwardly between sleeves 7 and 8. Since sleeve 8 is fixed to socket 2 and the socket bears against piece 9, this outward movement of the wedges necessarily produces forwards displacement of sleeve 7, piece 4 and tool-holder whereby the toolholder is wedged into the conical housing provided at the forward end of socket 2, and caused to tightly grip the tool inserted between its jaws.

Of course, I can vary the number and shape of the wedges and also the dihedral angles of the oblique parts without departing from the spirit of the invention.

In the example shown in Figures 3 and 4, the friction surfaces 7b and 8b of the sleeves are constituted by conical surfaces and the wedges are provided with surface elements of the same shape adapted to cooperate therewith. In this case, these wedges are kept in position along piece 11 by the fact that they include extension portions 12b through which they partly straddle piece 11.

The embodiment illustrated in Figs. 5 and 6 of the drawing is analogous to that of Figs. 3 and 4, with the difference that friction surfaces 7b and 8b, instead of being of conical shape, are flat shaped, forming two dihedral angles disposed opposite each other and between which the wedges are housed.

In the embodiment of Figs. 7 and 8, the sleeves are provided with analogous flat friction surfaces, but the wedges do not straddle piece 11. In this case, they are kept in position by two projections 7c and 8c, diametrally opposed to each other.

It should be noted that, according to the present invention, the oblique or conical friction surfaces may be replaced on one of the sleeves, and the corresponding side of the wedges, by a mere perpendicular abutment.

In general, while I have, in the above description, disclosed what I deem to be practical and efficient embodiments of the present invention, it should be well understood that I do not wish to be limited thereto, as there might be changes made in the arrangement, disposition and shape of the parts, without departing from the principle of the invention, as comprehended within the scope of the appended claims.

What I claim is:

1. A rotary tool holding device, which comprises, in combination, a relatively stationary hollow outer body, a socket mounted to rotate in said body, a jawed tool holder longitudinally slidable therein for controlling the tightening of its jaws, two longitudinally spaced sleeves fitting in said socket, the forward one of said sleeves being slidable therein and engaging the rear end of said holder, the rearward sleeve being fixed on said socket, a piece in said body providing a rear abutment for said socket, a driving shaft extending through said piece and said socket, a control piece carried by the end of said shaft extending into both sleeves and having at least one relatively uniformly inclined surface, and at least one wedge positioned in the space between said sleeves and slidably bearing against said inclined surface of the control piece, slots formed in the sleeves in which the wedge seats to key the sleeves for rotation together, said wedge and the slot of at least one of said sleeves being provided with cooperating oblique faces, whereby an outward radial movement of said wedge produced by a longitudinal displacement of the control piece effects longitudinal displacement of the forward sleeve acting to tighten the jaws of the tool holder on a tool inserted therein.

2. In a holder for a rotary dental tool or the like of the type wherein the holder consists of a relatively stationary hollow body, a socket mounted to rotate in said body, abutment means abutting the rearward end of the socket to retain it in place in the body, a tool holder in the forward part of said socket having jaws arranged to be contracted by forward pressure on the rear end of the holder to grip a rotary tool inserted therein, a forward sleeve freely slidable in said socket and operatively engageable with the rearward end of said toolholder, a rearward sleeve fixedly mounted on the rearward end of said socket and substantially spaced rearwardly from said forward sleeve, and a rotary driven shaft passing through the abutment means and into said socket, and a rotary control piece extending forwardly on the shaft within said rearward and forward sleeves; the improvement comprising at least one pair of longitudinally aligned slots formed in the adjacent ends of the forward and rearward sleeves, the bottoms of said slots being divergently angulated to define wedge surfaces, and at least one wedge positioned in the space between the adjacent ends of the rearward and forward sleeves, the wedge being seated in the slots so as to key the rearward and forward sleeves for rotation together, said control piece having a forwardly diverging flat side with the radially inward side of the wedge slidably bearing against thereagainst whereby the control piece is connected for rotation with the sleeves, said wedge having divergently angulated surfaces at its ends corresponding to and working upon the divergently angulated bottoms of the aligned slots in the sleeves, whereby movement of the control piece in a rearward direction can apply its flat side to the wedge with sufficient force to move the wedge in a radially outward direction against the angulated ends of the slots and thereby cause the forward sleeve to move forwardly and operate the tool holder to clamp a tool inserted therein.

3. In a holder for a rotary dental tool or the like of the type wherein the holder consists of a relatively stationary hollow body, a socket mounted to rotate in said body, abutment means abutting the rearward end of the socket to retain it in place in the body, a tool holder in the forward part of said socket having jaws arranged to be contracted by forward pressure on the rear end of the holder to grip a rotary tool inserted therein, a forward sleeve freely slidable in said socket and operatively engageable with the rearward end of said toolholder, a rearward sleeve fixedly mounted on the rearward end of said socket and substantially spaced rearwardly from said forward sleeve, and a rotary driven shaft passing through the abutment means and into said socket, and a rotary control piece extending forwardly on the shaft within said rearward and forward sleeves; the improvement comprising a pair of longitudinally aligned slots formed in the adjacent ends of the sleeves, the bottom of one of said sleeves being inclined at an angle divergent with respect to the axis of the control piece to define a wedge surface, a wedge positioned in the space between the sleeves, the ends of the wedge being seated in the slots to key the sleeves for rotation together, the control piece having a forwardly diverging side slidably bearing against the radially inward side of the wedge, the engaged sides of the control piece and wedge being arranged to abut in a manner to connect the control piece and the socket for rotation together through the wedge and the rearward sleeve, said wedge having a wedge surface at one end slidably engaging the wedge surface of said one of the slots, whereby longitudinal displacement of the control piece in one direction produces radially outward displacement of the wedge, followed by forward movement of the forward sleeve and consequent clamping of the tool in the tool holder.

4. A dental tool holder comprising a stationary hollow body, a socket mounted to rotate in said body, means preventing endwise movement of the socket in the body, a tool holder in the forward part of said socket having jaws arranged to contract on a tool as said holder is pressed forwardly, a forward sleeve and a rearward sleeve axially spaced therefrom, said forward sleeve being longitudinally slidable in said socket, means to transmit pressure to the rear end of said tool holder as the forward sleeve is pressed forwardly, means fixing said rearward sleeve in position in the socket, the facing ends of the sleeves being formed with recesses, a wedge positioned between the sleeves and in said recesses whereby the sleeves are connected for rotation together, said recesses having oppositely angulated wedge surfaces with which the inclined faces of the wedge can operatively engage, and a driven rotary control piece extending forwardly through the sleeves and along the inner side of the wedge, said inner side of the wedge and the coacting side of the control piece being mutually tapered and slidably engaged, whereby moving said control piece longitudinally relative to the sleeves in one direction operates the wedge to press said forward sleeve forwardly to contract the tool holder.

5. A dental tool holder, according to claim 4, wherein the wedge has projections embracing opposite sides of the control piece during engagement of the inner side of the wedge with the coacting side of the control piece whereby rotation of the control piece relative to the wedge is prevented.

6. A dental tool holder, according to claim 4, wherein the inner side of the wedge and the wedge surfaces of the recesses are conformably plane.

7. A dental tool holder, according to claim 4, wherein the inner side of the wedge and the wedge surfaces of the recesses are conformably conical.

8. A dental tool holder, according to claim 4, wherein the inner side of the wedge is slotted to conformably and slidably receive the control piece.

9. A dental tool holder, according to claim 4, wherein the facing ends of the sleeves have longitudinal projections extending to positions alongside of the inner side of the wedge so as to limit lateral movement of the wedge relative to the sleeves and the control piece.

10. A dental tool holder comprising a stationary hollow body, a socket mounted to rotate in said body, means preventing endwise movement of the socket in said hollow-body, a tool holder in the forward part of said socket having jaws arranged to contract to hold a tool as said holder is pressed forwardly, a forward sleeve and a rearward sleeve spaced rearwardly therefrom, said rearward sleeve being fixed in said sockekt and said forward sleeve being slidable in said socket toward and away from said rearward sleeve, means to transmit forward pressure to said tool holder as the forward sleeve is pressed forwardly, the facing ends of the sleeves being formed with a plurality of longitudinally aligned recesses, a plurality of wedges positioned between the sleeves and in aligned pairs of the recesses whereby the sleeves are connected for rotation together, said aligned recesses having oppositely angulated wedge surfaces with which the inclined faces of the wedges can operatively engage, and a driven rotary control piece extending forwardly through the sleeves and along the inner sides of the wedges, the inner sides of the wedges and the coacting sides of the control piece being mutually tapered and slidably engaged, whereby moving said control piece longitudinally relative to the sleeves in one direction operates the wedges to press said forward sleeve forwardly to contract the tool holder.

11. A dental tool holder, according to claim 10, wherein the inclined faces of the wedges and the wedge surfaces of the recesses are substantially plane and substantially conform in angulation.

12. A dental tool holder, according to claim 11, wherein the inclined faces of the wedges and the wedge surfaces of the recesses are conformably conical.

CLAUDE ETIENNE GARNIER.